Figure 1:
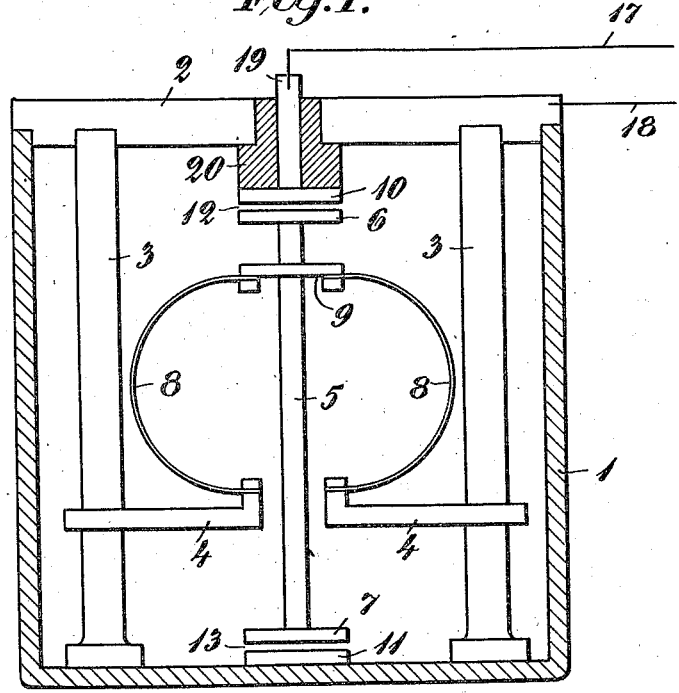

April 11, 1944.   A. R. LINDBLAD ET AL   2,346,593
DAMPING DEVICE IN GRAVIMETERS
Filed Jan. 2, 1941

INVENTORS
Axel R. Lindblad
Johan D. Malmquist
By: Stevens and Davis
ATTYS.

Patented Apr. 11, 1944

2,346,593

UNITED STATES PATENT OFFICE 2,346,593

DAMPING DEVICE IN GRAVIMETERS

Axel Rudolf Lindblad, Stockholm, and Johan David Malmqvist, Boliden, Sweden, assignors to Bolidens Gruvaktiebolag, Stockholm, Sweden, a joint-stock company limited of Sweden Application January 2, 1941, Serial No. 372,914
In Sweden January 5, 1940

2 Claims. (Cl. 265—1.4)

The present invention relates to an improvement in apparatus for determining the force of gravity, or variations therein, with the aid of a movable weighing body, the weight of which has been counterbalanced, for instance by means of a spring device, an electric or magnetic field or in other manner, which body, during its movement, is allowed to influence the electric or magnetic field in such a manner that the exact position of said body can be determined by observing changes in said field.

According to the invention there are arranged two or more narrow spaces between the movable weighing body and a stand. During its movement the weighing body will be more or less symmetrically damped by arranging said spaces or gaps between the movable weighing body and a stationary stand. The interspace in question is filled by a gas or a liquid. The inertia of these media in flowing inwards or outwards in the interspaces brings about a counter force which brakes the movements of the movable weighing body and thus damps said body. By the arrangement of two narrow free spaces the counterforce will be equally great whether the movable weighing body is moving upwards or downwards, i. e. the movable weighing body will be symmetrically damped.

In earlier constructions of apparatus of this type there has been provided a narrow space or gap filled with air or liquid and arranged between the movable weighing body and a stationary stand serving as an electric condenser, the capacity of which is dependent on the width of the space. Variations in the capacity of the condenser are measured in the electric way, so as to obtain a measure of the displacements of the movable weighing body relative to the stationary stand. The displacements are, however, dependent on the force of gravity, by means of which the movable weighing body may be influenced, and, therefore, it is possible to obtain a measure of the alterations in the force of gravity by the aid of the measuring device in question. Besides being an important member of the measuring device, the aforesaid space or gap has also served as a damping device. However, it has been found that the measuring results in the field, when using this simple damping device, will be unreliable when the apparatus is disposed to vibrations caused by the wind or by micro-seismic movements in the crust of the earth, which nearly always occur everywhere. The unreliability in this connection is caused thereby that the damping force will not be of the same magnitude when the movable weighing body is moving upwards and the width of the gaps is getting smaller as when the movable weighing body is moving downwards and the gap is getting greater. Therefore, when using this simple device the movable weighing body will oscillate to and fro relative to the position of equilibrium which does not correspond to the position of equilibrium at rest. Therefore, the arrangement of a further gap according to the invention involves a very essential improvement by means of which a double and symmetric damping will be obtained.

Figure 2:
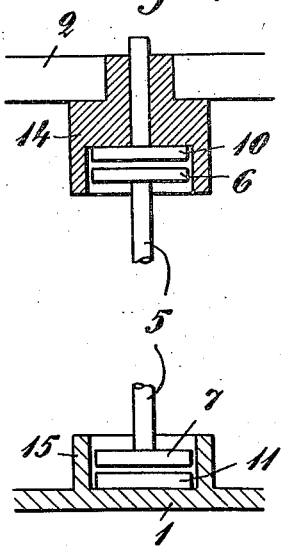

In order to elucidate the invention there is shown an embodiment of the same in the accompanying drawing wherein Figure 1 is a vertical section, and Figure 2 shows another embodiment of some details.

The apparatus is mounted in a vessel 1 closed at its top by a cover 2. Within the vessel 1 two columns 3 are arranged which columns carry supports 4 extending towards the centre of the vessel. In this vessel a movable body 5 is provided which at the top is in the shape of a plate 6 and at the bottom forms a plate 7. The movable body 5 is carried by two leaf springs 8, the lower portions of which are attached to the inner ends of support devices 4, the upper ends of the springs being fastened to a member 9 secured to the body 5. By means of the springs 8 the movable body 5 is normally counterbalanced in a certain position. At a short distance from the plates 6 and 7, respectively, plates 10 and 11, respectively, are secured to the stand or vessel of the weighing apparatus. The distance between the plates 6—10 and 7—11, respectively, as a rule, should be substantially equal and the areas of the plates should also be equal, since, otherwise, it will be more difficult to arrange the relation between the areas of the plates and the distance between them in such a manner as to obtain a symmetric damping. The gaps 12 and 13, respectively, between the plates can be filled with air or another gas, or with a liquid of low viscosity.

The plates 10, 6, 7, 11 need not necessarily be in the shape of plane plates as in the example given above, but may also be of other form. Thus, the surfaces of the movable weighing body, as also those of the stand, may be spherically ground, so that the gaps proper will be in the shape of spherical calottes, that is, the surfaces of the stationary plates 10 and 11 are ground to a shape corresponding to the opposite surfaces of the plates 6 and 7, i. e. if the surfaces of these latter for instance are convex, the other ones are concave, having the same radius of curvature.

From Figure 1 in the accompanying drawing it will be clearly seen that, provided the plates 10, 6, 7, 11 are of the same area and the gaps are equally great, the damping will be the same, whether the weighing body 5 is moving upwards or downwards, which, in other words, means that it is symmetric. If the weighing body is moving upwards at a certain amplitude, the gap 12 will be smaller, whereas the gap 13 will be greater. If, on the other hand, the weighing body is moving downwards at the same amplitude, the gap 13 will be smaller and the gap 12 greater. In both cases, however, the total of the damping forces on the movable weighing body will be equally great. Upon the upward movement of the weighing body the component of the damping force at the upper gap 12 will thus be equal to the corresponding component at the lower gap 13, when the weighing body is moving downwards at the same amplitude.

It will be easily seen that symmetric damping may be brought about in a similar manner whether only the upper, the lower or both gaps are divided into more cooperating gaps. Principally, the damping effect will still be the same whether for instance the lower gap 13 consists of one gap or is divided into two cooperating smaller gaps. Thus, in order to bring about symmetric damping in the above mentioned manner, at least two gaps are required, but such damping can also be obtained by arranging more than two gaps.

In Figure 2 there is shown another embodiment constructed according to the invention, in which the plates on the movable weighing body slide into cylindrically shaped depressions 14 and 15, respectively, in the stationary stand. However, it is not necessary that the plates are positioned at the top or bottom of the movable weighing body, but they may also be located in another place on the movable weighing body. However, as a rule, the gaps should be arranged in a mirror-symmetric manner, the mirror-symmetry existing relative to a plane perpendicular to the longitudinal axis of the weighing body.

Experiments have shown that it is important that the gaps between plates 6—10 and 7—11 respectively remain very nearly constant at temperature variations. This is made possible by selecting materials having suitable coefficients of expansion as regards the material in the stands as well as regards the material of the movable weighing body 5. Provisions can be made in several ways so as to obtain a parallel displacement of the same magnitude of all the plates upon temperature variation. Best results will, however, be obtained when selecting materials having very small coefficients of expansion, care being taken not to select a ferromagnetic material for use in the movable weighing body, because, otherwise, the movable weighing body will be influenced by the earthmagnetic field.

The measuring of the capacity of the condenser can be carried out by means of any suitable capacity meter (not shown), for instance an ultra-micrometer, inserted between the wires 17 and 18 of which wires the wire 17 is connected to the spindle shaped portion 19 in the way indicated in the drawing, said portion 19 being associated with the plate 10 and surrounded by an electric insulation 20. The plate 10 forms one portion of the condenser 12, the capacity of which varies at changes in the position of the movable body. The wire 18 is connected to the plate 6 which forms the other portion of the condenser 12 by means of an electrically conducting material in the cover 2, the columns 3, the supports 4, the springs 8 and the movable body 5. By measuring the variations in the capacity of the condenser 12 when the apparatus is moved from one place to another a relative expression for the magnitude of the force of gravity is obtained at the various places of observation.

Having thus described our invention, we declare that what we claim is:

1. In a gravity meter adapted for use in measuring the force of gravity or small changes therein, comprising in combination a movable weighing body, a support for said weighing body, means for elastically securing the weighing body to the support and for counterbalancing the gravitational force component acting upon the weighing body, means for damping the weighing body, said means comprising at least two plates carried by the weighing body and at least two stationary plates secured to the support, and which are positioned at substantially exactly the same distance respectively from the stationary plates, all of said plates having uninterrupted plane surfaces and being of the same area whereby at least two narrow gaps are formed between the stationary plates and the plates carried by the weighing body, and whereby a fluid in the gaps will be acted upon by the moving plates to effect a damping of the weighing body, the plates forming one of said gaps being insulated one from the other and constituting elements of a condenser the capacity of which is a function of the displacement of the weighing body.

2. A device according to claim 1 characterized in that the surfaces of the plates arranged in the support are disposed above and below the surfaces of the plates stationarily located on the movable weighing body.

AXEL RUDOLF LINDBLAD.
JOHAN DAVID MALMQVIST.